United States Patent
Thijssen

(10) Patent No.: US 6,230,163 B1
(45) Date of Patent: May 8, 2001

(54) TRANSIENT DATASTREAM-PROCESSING BUFFER MEMORY ORGANIZATION WITH SOFTWARE MANAGEMENT ADAPTED FOR MULTILEVEL HOUSEKEEPING

(75) Inventor: Paulus T. A. Thijssen, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/134,106

(22) Filed: Aug. 14, 1998

(30) Foreign Application Priority Data

Aug. 20, 1997 (EP) .................................................. 97202555

(51) Int. Cl.$^7$ ....................................................... G06F 17/30
(52) U.S. Cl. ........................... 707/200; 707/201; 707/203; 707/205; 725/50
(58) Field of Search ...................................... 707/200, 201, 707/203, 205; 709/219, 231; 375/240.15, 240.25, 265, 341; 711/147, 206; 710/35; 713/200; 714/6, 15; 345/302; 341/151; 725/50

(56) References Cited

U.S. PATENT DOCUMENTS

| | | | |
|---|---|---|---|
| 4,222,102 | 9/1980 | Jansen et al | 710/57 |
| 4,236,225 | 11/1980 | Jansn et al. | 710/57 |
| 4,314,361 | 2/1982 | Jansen et al. | 365/221 |
| 5,487,167 | * 1/1996 | Dinallo et al. | 345/302 |
| 5,652,613 | * 7/1997 | Lararus et al. | 725/50 |
| 5,847,762 | * 12/1998 | Canfield et al. | 375/240.15 |
| 6,023,233 | * 2/2000 | Craven et al. | 341/51 |
| 6,067,636 | * 5/2000 | Yao et al. | 714/15 |

FOREIGN PATENT DOCUMENTS

0684562A1   11/1995   (EP)   ......................................... 12/10

OTHER PUBLICATIONS

IEEE publication, "An MPEG–2 digital decoder design: A pratical approach with emphasis on elementary stream data flows" by Greg Reid, pp. 37–42, Sep. 1997.*

M. Yasuda et al, "MPEG2 Video Decoder and AC–3 Audio Decoder LSIs for DVD Player", IEEE Trans. on Consumer Electronics, vol. 43, No. 3, Aug. 1997, pp 452–468.

Kien A. Hua et al, "Earthworm: A Network Memory Management Technique for Large–Scale Distributed Multimedia Applications", IEEE Computer and Communications Societies, vol. 43, Aug. 1997, pp 990–997.

* cited by examiner

*Primary Examiner*—Thomas Black
*Assistant Examiner*—Diane Mizrahi
(74) *Attorney, Agent, or Firm*—Michael E. Belk

(57) ABSTRACT

A transient datastream-processing buffer memory organization with software management adapted for multilevel housekeeping. A datastream-processing system has a datastream input, storage for transiently storing the datastream, apparatus for accessing a buffer memory, and apparatus for memory housekeeping. In particular, management apparatus is provided by software.

5 Claims, 2 Drawing Sheets

TRANSIENT DATASTREAM-PROCESSING BUFFER MEMORY ORGANIZATION WITH SOFTWARE MANAGEMENT ADAPTED FOR MULTILEVEL HOUSEKEEPING

BACKGROUND OF THE INVENTION

The invention relates to a datastream-processing buffer memory organization, U.S. Pat. Nos. 4,314,361, 4,236,225, and 4,222,102 respectively describe FIFO(first in first out) organizations with fixed input and variable output, with variable input and fixed output, and with both variable input and variable output. For effecting such elementary FIFO functionality the references use exclusively hardware-based housekeeping.

SUMMARY OF THE INVENTION

The present inventor has experienced a need for an enhanced and more flexible functionality, in particular to allow more complicated processing modes. Moreover, moving of information from one physical location to another should be kept as restricted as possible, in view of limited transfer capability viz à viz ever larger datastream volumes, so that no undue delays will be incurred. This applies even more when the same data items are used several times for respective functions. A final argument against physical movements is that power consumption for physical data transport should be kept low.

In consequence, amongst other things, it is an object of the present invention to allow the mapping of various logical buffers on shared physical memory space, whilst dimishing physical data transfer to an extremely low amount.

Advantageously, the memory management is arranged for multilevel housekeeping. The definition of the data format often has specified various successive levels. Through assigning the housekeeping with respect to a particular format level to an associated housekeeping level, flexibility is attained in an easy manner. Further advantageous aspects of the invention will be disclosed or become obvious to those skilled in the art by studying the detailed description below with reference to the following drawings which illustrate the elements of the appended claims of the inventions.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1:
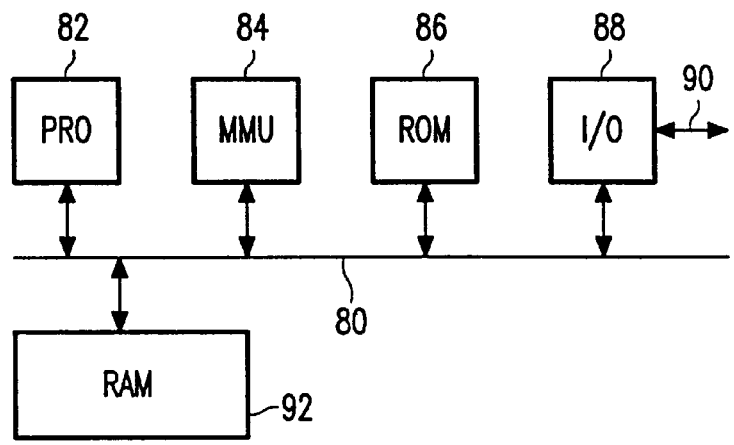
FIG. 1, exemplary hardware for thereon mapping the organization.

FIG. 1 shows an exemplary hardware embodiment for thereon mapping the organization of the invention. The processor is centred around bus facility 80 that has sufficient capacity for the application and has an appropriate width for transferring data, addresses, and control signals between the various subsystems connected thereto. I/O(input and/or output) subsystem 88 interfaces to the external world through interconnection 90. Processing facility 82 executes necessary processing operations. RAM(random access memory) memory 92 stores the data proper according to an organization that will be disclosed more in detail with reference to FIG. 2 hereinafter. Memory Management Unit 84 executes various housekeeping tasks with respect to memory 92. ROM memory 86 may allow storage of the appropriate software, inasfar as this is not stored in processing facility 82.

Figure 2:
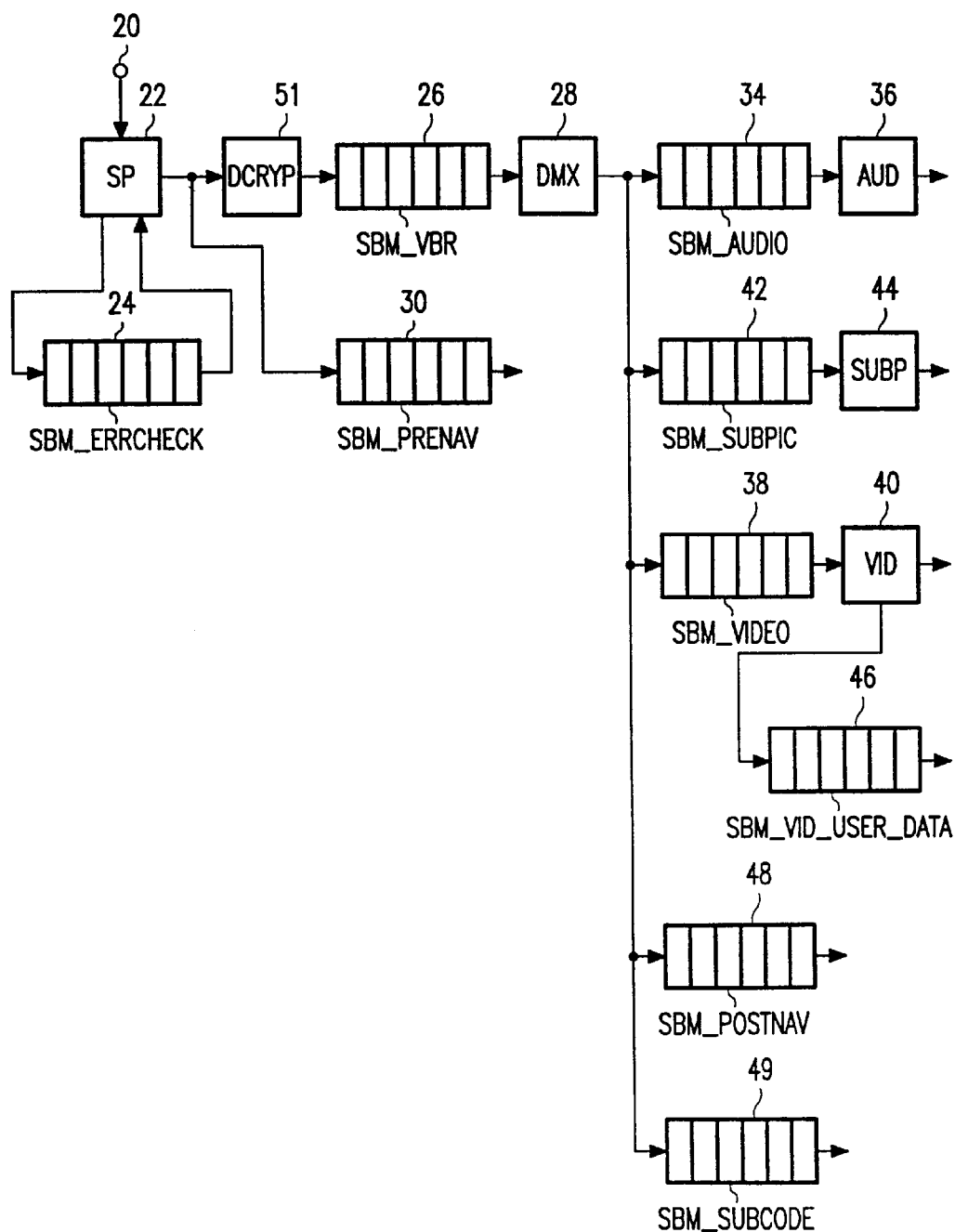
FIG. 2, an example of a data flow organization.

FIG. 2 shows an example of a data flow organization. Herein, serial data are received on datastream input 20 from an appropriate source, such as an optical high volume disc or a remote broadcast or line source. Multiple sources may be connectable in parallel or in alternation. The width of the data stream may be defined in appropriate manner. In the embodiment hereinafter, the data source is a DVD (digital video disk) or VCD disc that stores digital video complete with associated digital audio and also various extra data to enable further functionalities to the system and to the user.

Module 22 reads the data and stores it in buffer 24. In particular, this module has a DMA feature. Here, the storage is physical, inasmuch as the data is received from the external world, such as on connection 90 in FIG. 1. Subsequent writing of the data to other buffers is generally executed through logical assigning of the data as will be discussed hereinafter. If applicable, read-modify-write memory cycles can be executed, in which case there is physical data transport between processing facility and memory. Furthermore, module 22 may perform error checking on the data, and if necessary and feasible, error correction. Upon finding or reaching an appropriate level of correctness, user data are presented to decryption control module 51. These user data exclude sector headers and error checking information ECC.

Next to decryption control module 51, the corrected data are assigned to buffer 30, that is used for a pre-navigation feature. This allows a user to navigate through the data in a fast manner, such as fast forward or fast reverse, through using non-encrypted data, and without necessitating any further operations on the data. In decryption control module 51, the data are decrypted if necessary, through an appropriate decryption key. Next, the decrypted data are assigned to buffer 26. This buffer receives data at a uniform high rate, and outputs data at a variable rate, in accordance with various source compactions that may be present. Module 28 accesses the data in buffer 26, and dispatches the readout data to further buffers 34, 38, 42, 48, 49, the first three of which interface to modules 36, 40, 44, respectively.

In the embodiment, module 40 is an MPEG video decoder that requires a packetized elementary stream PES as input. Further, module 36 is an MPEG audio decoder that requires an elementary stream as input. Module 44 is a subpicture decoder. Buffer 48 allows similar user navigation as buffer 30, but in a more precise manner such as through so-called seamless jumping, whilst also taking into account various presentation control modes, such as information that has been copy-protected. Buffer 49 allows storage of subcode items that can be used for various overlaying functionality types, such a timecode display and further user navigation.

The housekeeping with respect to buffers 34, 38, is such that only the necessary parts of the information are read by modules 36, 40, 44. A final buffer 46 is fed by video decoder 40, for buffering user data such as closed-caption information. The various buffer sizes will be specified hereinafter. These sizes are based on the organization of the related packetizing of the datastream. For example, the amount of video information is relatively large with respect to the amount of audio information, whereas the amount of subcode information is still much less.

Various one of the modules shown, not necessary exclusively on the rightmost or lowest level, access the stored data for outputting the result to a user or user device, which has been shown by respective arrows. Such device may be a television monitor for video, an audio presentation device for audio, and similarly for still further streams of user information data. Another example would be a further control device not shown such as one that may serve for effecting further types of user navigation.

Figure 3:
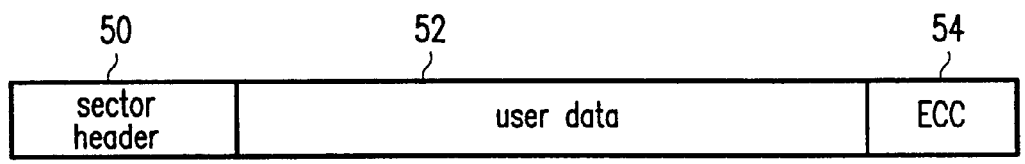
FIG. 3, an exemplary sector header format.

FIG. 3 shows an exemplary sector format; this pertains to the format as relevant on interface 20. As shown, a sector contains a sector header, that delimits the sector, indicates a time value, an identifier, and possibly other parameters that may be used for subsequently organizing the storage proper. Part 54 contains error protection code, such as the redundancy symbols of a Reed-Solomon code that can be used for correcting a percentage of the symbols that have been received in an incorrect manner. After executing the correction, part 54 generally is of no use for further processing. Generally, the header and ECC information are sequestered and not used in subsequent accessing.

Figure 4:
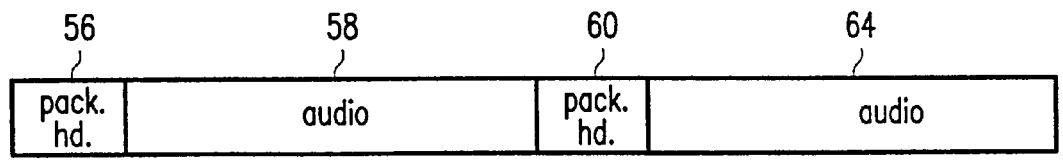
FIG. 4, an exemplary user data format of an audio sector.

FIG. 4 shows an exemplary user data format of an audio sector. Here, the sector contains two packets of audio data, that each comprise a relevant packet header information, and two parts of the relevant audio data. The number of audio parts may be different, and their sizes may be non-uniform. The function of the headers on this level may be variable. Sometimes, the header information is sequestered and not used in subsequent accessing. Other decoder types may use the header for easier delimitation of the information.

Further legends of FIG. 2 are as follows:
SBM: Stream Buffer Manager
SP: Sector Processor
DCRYP: DeCRYPtion Control
DMX: DeMultipleXer
AUD: AUDio decoder
VID: VIDeo decoder
SUBP: SUBPicture decoder
Capacity of a DVD disc: 14 GByte
Input data rate: 11 Mbit/sec
Buffer size indications:
SBM_ERRCHECK 10 KByte
SBM_VBR 500 KByte
SBM_PRENAV 20 KByte
SBM_AUDIO 20 KByte
SBM_VIDEO 250 KByte
SBM_SUBPIC 64 KByte
SBM_POSTNAV 20 KByte
SBM_SUBCODE 1 KByte
SBM_VID_USER_DATA 5 KByte The SBM controls all buffer accesses in a manner that is invisible for producer as well as for consumer processes, and in particular controls:
  a pool of buffer units
  for each unit an administration of the number of references to it from any buffer
  a linked list indicating the free buffer units
  for each buffer a linked list of buffer units plus additional administration for the applicable range(s) inside a buffer unit.

All buffers are assumed to be FIFO's, with an additional non-destructive 'peek' facility; in other applications, a different organization such as random access may apply. In particular, the scenario is given as follows in the form of a list, as an alternative of a standard flow-chart:

data comes in on the left-hand side of the pictures in chunks of N bytes (sector size);

the size of the units is also N bytes

SP requests SBM to write N bytes to SBM_ERRCHECK

SBM takes the first unit from the free list and sets up DMA to copy the data in

SBM sets the number of references to the unit to "1"

SBM adds the unit to the list of buffer SBM ERRCHECK with range indication [0,N); generally, the lower buffer boundary is included, the upper one is not if after M new sectors no error has been indicated by the hardware, SP assumes the sector to be correct SP reads X bytes (sector header size) from SBM_ERRCHECK SBM updates the range indication to [X,N)

via a 'peek' read, SBM determines if it is a NAV pack

SP requests SBM to copy N−X−Y bytes from SBM_ERRCHEGK to SBM_VBR (Y equals the ECC size)

if it is a NAV pack, SP also requests SBM to copy the (N−X−Y) bytes to SBM_PRENAV SBM adds the unit to the list of SBM_VBR with range indication [X, N−Y) and increments the number of references to the unit if it is a NAV pack, SBM also adds the unit to the list of SBM_PRENAV with range indication [X,N−Y) and increments the number of references to the unit again SBM updates the range indication in SBM_ERRCHECK to [N−Y,N)

SP requests SBM to read Y bytes from SBM_ERRCHECK

SBM updates the range indication in SBM_ERRCHECK to [N,N)

this means that there is no data in the unit for this buffer, so SBM removes the unit from the list of SBM_ERRCHECK and decrements the number of references to the unit DMX determines the packet type and size S by 'peeking' SBM_VBR in case of a NAV pack, DMX requests SBM to copy S bytes from SBM_VBR to SBM_POSTNAV SBM adds the unit to the list of SBM_POSTNAV with range indication [X,X+S) and increases the number of references to the unit SBM updates the range indication of the unit in SBM_VBR to [X+S,N−Y)

the application wants to read B bytes from SBM_POSTNAV

SBM updates the range indication of the unit in SBM_POSTNAV to [X+B,X+S).

Suppose an audio decoder requires a PES stream:
  when DMX discovers audio packets in SBM_VBR, it can request SBM to copy them completely to SBM_AUDIO
  consequently, SBM will add the corresponding unit to the list of SBM_AUDIO and set the range indication to [X,N−Y), where X and Y correspond to the sector header and ECC sizes as indicated in FIG. 3
  note that the unit is also removed from the list of SBM_VBR.

Suppose an audio decoder requires an elementary stream:
  suppose that the contents of the first unit in the list of SBM_VBR are as presented in FIG. 4 the range indication of this unit is [X,N−Y)

by 'peeking', DMX discovers an audio packet in SBM__VBR and determines packet header size Q1 and packet size S1

DMX requests SBM to read Q1 bytes from SBM__VBR

SBM updates the range indication of the unit in SBM__VBR to [X+Q1,N−Y)

DMX requests SBM to copy S1−Q1 bytes to SBM__AUDIO

SBM adds the unit to the list of SBM_AUDIO and increments the number of references to the unit SBM sets the range indication in the SBM_AUDIO buffer to [X+Q1,X+S1)

SBMi sets the range indication in the SBM__VBR buffer to [X+S1,N−Y)

by 'peeking', DMX discovers an audio packet in SBM__VBR and determines packet header size Q2 and packet size S2

DMX requests SBM to read Q2 bytes from SBM__VBR

SBM updates the range indication of the unit in SBM__VBR to [X+S1+Q2,N−Y)

DMX requests SBM to copy S2−Q2 bytes to SBM__AUDIO

SBM adds the unit to this list of SBM_AUDIO and increments the number of references to the unit (this means that the same unit is referenced multiple times from the same buffer; also see note below)

SBM sets the range indication in the SBM_AUDIO buffer to [X+S1+Q2,X+S1+S2)

note that in this example, X+S1+S2 equals N−Y

SBM sets the range indication in SBM__VBR to [N−Y, N−Y)

this means that the unit can be removed from SBM__VBR and the number of references to the unit can be decremented In the above, an optimization may be to indicate multiple ranges. In the case of an audio decoder requiring an elementary stream, this could apply to the situation that the range indication of an element in the list of SBM_AUDIO would have a range indication {[X+Q1,X+S1),[X+S1+Q2,N−Y)}, meaning that a single unit would point at two respective ranges.

What is claimed is:

1. A datastream-processing system comprising:
    a datastream input;
    storage means for transiently storing the datastream in a buffer in memory;
    accessing means for accessing the buffer; and
    memory management means, provided by structures in the memory, for providing multilevel memory housekeeping.

2. The system of claim 1, wherein an initial level housekeeping executes error protection measures and sequesters datastream formatizing items.

3. The system of claim 1, wherein a non-initial level housekeeping sequesters user data formatizing items.

4. The system of claim 1, wherein the multilevel housekeeping numbers at least three levels.

5. The system of claim 1, wherein at least one level separates various monomedia information categories.

* * * * *

UNITED STATES PATENT AND TRADEMARK OFFICE
CERTIFICATE OF CORRECTION

PATENT NO. : 6,230,163 B1
DATED : May 8, 2001
INVENTOR(S) : Paulus T.A. Thijssen It is certified that error appears in the above-identified patent and that said Letters Patent is hereby corrected as shown below:

Title page,
Item [57], ABSTRACT,
Line 1, delete "A transient datastream-processing buffer memory organization".
Line 2, delete "with software management adapted for multilevel".
Line 3, delete "housekeeping".

Signed and Sealed this

Twenty-ninth Day of October, 2002

Attest:

Attesting Officer

JAMES E. ROGAN
Director of the United States Patent and Trademark Office